O. H. JOBSKI.
RIM.
APPLICATION FILED JUNE 7, 1920.
1,430,656.
Patented Oct. 3, 1922.
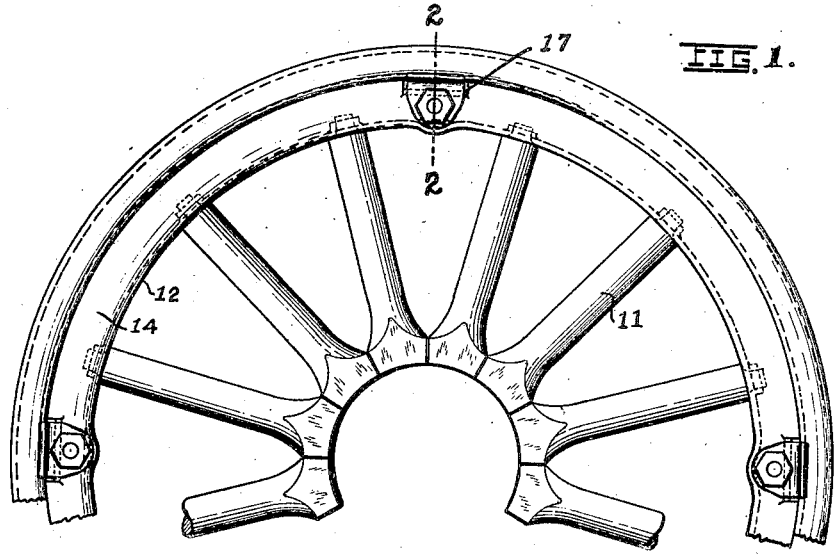
FIG. 1.
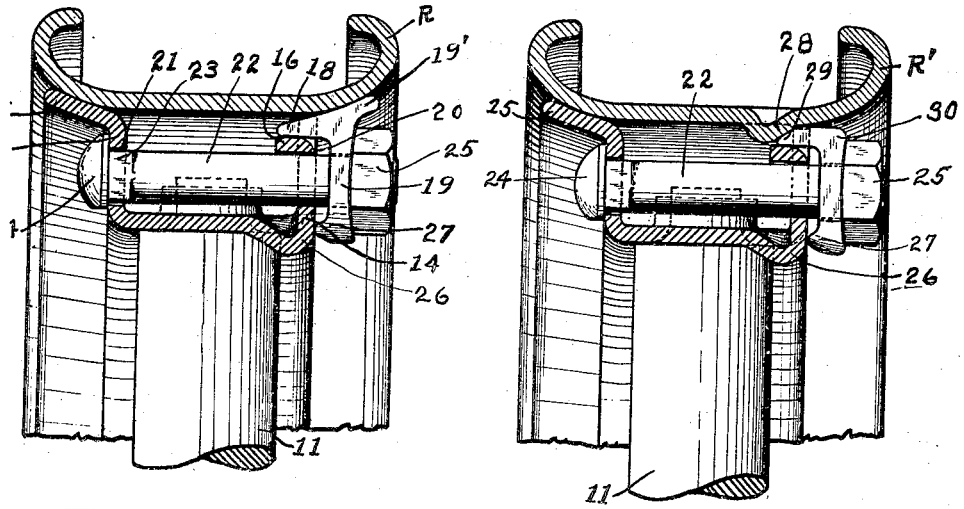
FIG. 2.
FIG. 3.
Inventor
OTTO H. JOBSKI.
Attorney Patented Oct. 3, 1922.

1,430,656

UNITED STATES PATENT OFFICE.

OTTO H. JOBSKI, OF CLEVELAND, OHIO, ASSIGNOR TO THE STANDARD PARTS COMPANY, OF CLEVELAND, OHIO, A CORPORATION OF OHIO.

RIM.

Application filed June 7, 1920. Serial No. 386,963.

*To all whom it may concern:*

Be it known that I, OTTO H. JOBSKI, a citizen of the United States, and a resident of Cleveland, county of Cuyahoga, State of Ohio, have invented certain new and useful Improvements in Rims, of which the following is a specification.

This invention relates to an improvement in wheels for automobiles or other wheels of the type in which the use of the wooden felly is obviated.

The principal object of the invention is to provide a wheel having a metal felly of a type which is much shallower and, hence, lighter, than the forms used heretofore and of simple form, readily manufactured.

Further objects of the invention will be apparent in the course of the following description of the invention, taken in connection with the accompanying drawings in which illustration of the practical embodiment of the invention is given.

Figure 1 is a side view of a wheel made in accordance with my invention;

Fig. 2 is a cross-section substantially on line 2—2 of Fig. 1, the wedge and bolt being shown in elevation, for the sake of clearness; and Fig. 3 is a cross-section, like Fig. 2, but showing a slightly different form of rim attached to the wheel.

Referring now particularly to Fig. 2, though, except for the form of wedge and rim employed, the description applies equally to Fig. 3, it will be seen that the reduced portions of the spokes 11 of the wheel are inserted in the openings in the felly 12, about which the metal has been turned down. The felly 12 is rolled from sheet steel and has the upstanding sides 13 and 14 forming a channel. Extending from side 13 is the beveled flange 15 forming a seat for one edge of the tire rim R. At intervals along the side 14, slits are cut and the metal turned over as at 16, forming openings 17 for the insertion of a lip 18 of the wedge 19 having the rim seat 19'. Radially inward of and adjacent each opening 17 in the side 14 are formed openings 20, and in side 13 and registering with the last-named openings are the, preferably, rectangular openings 21. Through each pair of registering openings passes a bolt 22 having the rectangular portion 23 seated in the opening 21 and having head 24 formed at the end of the bolt adjacent part 23. Near its other end, the bolt passes through an opening in wedge 19 and is threaded for the reception of nut 25, in the usual manner. The turned over portion 16 of the side furnishes a support for the lip 18 of the wedge which supports, on its upper side, by means of the rim seat 19' mentioned, the rim R. Radially inward of each opening 20 is a stamped-up projection 26, forming a rest for the lower extension or heel 27 of the wedge 19. It will thus be seen that the channel of the felly 12 may be made very shallow and, yet, at the same time, through the formation of the projections 26, form a supporting and steadying means for wedge 19.

The showing of Fig. 3 is the same as that of Fig. 2, except that the rim R' is shown as formed with the stamped-up lug or depression 28 which cooperates with the lip 29 of wedge 30. The wedge differs from that shown in Fig. 2 only by the omission of seat 19', since in this form the rim is seated with its lug or stamped-up depression 28 against the lip 29 of the wedge. All other parts are the same as in Fig. 2.

It is, of course, to be understood that the particular embodiments of the invention illustrated and described are merely typical embodiments of the invention and that the specific constructions are given merely by way of illustration and are not intended to limit the invention to such forms, as, obviously, many changes in construction and design may be made without departing from the spirit and scope of my invention.

Having thus described my invention, what I claim is:

1. In a device of the class described, the combination of a felly having a middle portion and side portions forming a channel, a stamped-up projection at one of said sides extending radially inward of said channel, a tire rim on said felly, and means, including a member contacting with said rim and projection, for clamping said rim on the felly.

2. In a device of the class described, the combination of a metal felly having a channel, a stamped-up projection at one side of said channel and extending radially inward thereof, a slot adjacent said projection, a demountable tire rim on said felly, and means, including a member bearing on the projection and having a lip passing through said slot and bearing on said rim, for clamping said rim on said felly.

3. In a device of the class described, the combination of a metal felly having a channel, a stamped-up projection at one side of said channel and extending radially inward thereof, said side having a portion radially outward of said projection turned down to extend axially of said wheel, a tire rim on said felly, and means, including a member bearing on said projection and rim, and having a lip resting on said axially extending portion, for clamping said rim on the felly.

4. In a device of the class described, the combination of a metal felly having a channel, a flange at one side of said channel forming a rim seat, stamped-up projections on said felly extending radially inward thereof, a tire rim on said felly, and means, including members bearing on said projections, for clamping said rim on said felly.

5. In a device of the class described, the combination of a metal felly having a middle portion and side portions forming a channel, a stamped-up projection at the juncture of one of said side portions with said middle portion and extending radially inward thereof, a tire rim on said felly and having a stamped-up depression therein, and means, including a member bearing on said projection and depression, for clamping said rim on the felly.

6. In a device of the class described, the combination of a metal felly having a middle portion and side portions forming a channel, a stamped-up projection formed at the side of said channel and extending radially inward thereof, a tire rim on said felly, a member bearing on said projection and rim, one of said side portions and the last-named member having registering openings, and means, including a bolt passing through said registering openings, for clamping said parts together.

7. In a device of the class described, the combination of an integral metal felly, having a spoke-receiving member, a portion bearing a rim seat extending from said spoke-receiving member, a stamped-up projection adjacent said member and extending radially inward thereof, a tire rim bearing on said seat, and means, including parts cooperating with said projection and rim, for clamping said rim on said felly.

8. In a device of the class described, the combination of a metal felly having a middle portion and side portions forming a shallow channel, a stamped-up projection at the juncture of said middle portion and one of said side portions and extending radially inward thereof, a turned down axially extending portion on said side adjacent said projection, and means, including a member bearing on said projection and rim and having a lip resting on said axially extending portion, for clamping said rim on said felly.

In testimony whereof I affix my signature.

OTTO H. JOBSKI.